US009875326B2

United States Patent
Alpert et al.

(10) Patent No.: US 9,875,326 B2
(45) Date of Patent: Jan. 23, 2018

(54) ADDRESSING COUPLED NOISE-BASED VIOLATIONS WITH BUFFERING IN A BATCH ENVIRONMENT

(71) Applicant: International Business Machines Corporation, Armonk, NY (US)

(72) Inventors: Charles J. Alpert, Austin, TX (US); William E. Dougherty, Jr., Pittsburgh, PA (US); Zhuo Li, Cedar Park, TX (US); Stephen T. Quay, Austin, TX (US); Ying Zhou, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 14/959,121

(22) Filed: Dec. 4, 2015

(65) Prior Publication Data
US 2017/0161407 A1  Jun. 8, 2017

(51) Int. Cl.
*G06F 17/50* (2006.01)
(52) U.S. Cl.
CPC .................. *G06F 17/505* (2013.01)
(58) Field of Classification Search
USPC ........................................................ 716/104
See application file for complete search history.

(56) References Cited

U.S. PATENT DOCUMENTS

| 6,117,182 A | 9/2000 | Alpert et al. |
| 6,983,436 B2 | 1/2006 | Amekawa |
| 7,360,182 B2 | 4/2008 | Dutta et al. |
| 7,685,549 B2 | 3/2010 | Sinha et al. |
| 8,244,491 B1 | 8/2012 | Zhang |
| 8,316,334 B2 | 11/2012 | Nagaraj et al. |
| 8,423,940 B2 | 4/2013 | Daellenbach et al. |
| 8,595,669 B1 | 11/2013 | Keller et al. |
| 8,863,058 B2 | 10/2014 | Nagrath et al. |
| 2008/0209376 A1* | 8/2008 | Kazda ................. G06F 17/5068 716/113 |
| 2012/0174052 A1* | 7/2012 | Mathur ............... G06F 17/5077 716/129 |

FOREIGN PATENT DOCUMENTS

| JP | 2004280439 A | 10/2004 |
| JP | 2012168624 A | 9/2012 |

* cited by examiner

*Primary Examiner* — Bryce Aisaka
(74) *Attorney, Agent, or Firm* — Francis Lammes; Stephen J. Walder, Jr.; Mercedes L. Hobson

(57) ABSTRACT

A mechanism is provided for addressing coupled noise-based violations. For each net in an integrated circuit (IC) design, a determination is made as to whether an associated delta wire delay is below a predetermined threshold. Responsive to the associated delta wire delay failing to be below the predetermined threshold, a subset of nets is formed. For each net in the subset of nets, a stage delay side model of the net is adjusted to emulate a noise impact on timing of the net and an optimization is applied using the stage delay side model of the net. A full retiming of the set of nets is then performed. For each net in the subset of nets a determination is made as to whether the net has degraded slack and, responsive to the net having degraded slack, the applied optimization is backed out.

14 Claims, 7 Drawing Sheets

ADDRESSING COUPLED NOISE-BASED VIOLATIONS WITH BUFFERING IN A BATCH ENVIRONMENT

BACKGROUND

The present application relates generally to an improved data processing apparatus and method and more specifically to mechanisms for addressing coupled noise-based violations with buffering in a batch environment.

Modern day electronics include components that use integrated circuits. Integrated circuits are electronic circuits formed using Silicon as a substrate and by adding impurities to form solid-state electronic devices, such as transistors, diodes, and resistors. Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as my amplifying, filtering, or mixing the signals, and produce an analog or digital output. Generally, any type of circuit can be designed as an IC.

The software tools used for designing ICs produce, manipulate, or otherwise work with the circuit layout at very small scales. Some of the components that such a tool may manipulate may only measure tens of nanometers across when formed in Silicon. The designs produced and manipulated using these software tools are complex, often including millions of such components and wires, often referred to as nets, interconnected to form an intended electronic circuitry.

Noise is a random fluctuation in an electrical signal, which is a characteristic of all electronic circuits. Noise generated by electronic devices varies greatly, as the noise may be produced by several different effects. Eliminating noise or more specifically Noise Impact on Timing (NIOT) is a major component of achieving timing closure on larger design units after detail routing. A wire or net, i.e. a "victim net", that contributes to path delay may have that contribution tripled by NIOT. Delta wire delay is the signal assignment propagation delay inherent in each net. This delta wire delay may increase the stage delay, i.e. the combination of all the delta wire delays for each net as well any gate delays for each component of the circuit, when NIOT is taken into account.

Accordingly, interconnect performance, taking into consideration all delay factors, is becoming increasingly dominant over transistor and logic performance in the deep submicron regime. Buffer insertion is a fundamental technology used in modern integrated circuit design methodologies to address delay factors. As gate delays decrease with increasing chip dimensions, the number of buffers required quickly rises. Furthermore, after detail routing, calculating NIOT is typically a central processing unit (CPU) intensive "batch" operation, which is dependent on 2.5D or 3D coupled parasitic analysis; delta wire delay that is a function of relative location of the coupling to the aggressor net, resistive shielding in wire, drive strength and slew of source, arrival time of source and victim signals; complex interplay determining whether signals will be switching in same timing window; and incremental recalculation of NIOT after making small updates to the design, all of which is CPU intensive.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for addressing coupled noise-based violations. For each net in an integrated circuit (IC) design, the illustrative embodiment determines whether an associated delta wire delay is below a predetermined threshold. Responsive to the associated delta wire delay failing to be below the predetermined threshold, the illustrative embodiment forms a subset of nets. For each net in the subset of nets, the illustrative embodiment adjusts a stage delay side model of the net to emulate a noise impact on timing of the net and applies an optimization using the stage delay side model of the net. The illustrative embodiment performs a full retiming of the set of nets. For each net in the subset of nets, the illustrative embodiment determines whether the net has degraded slack and, responsive to the net having degraded slack, the illustrative embodiment backs out the applied optimization.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
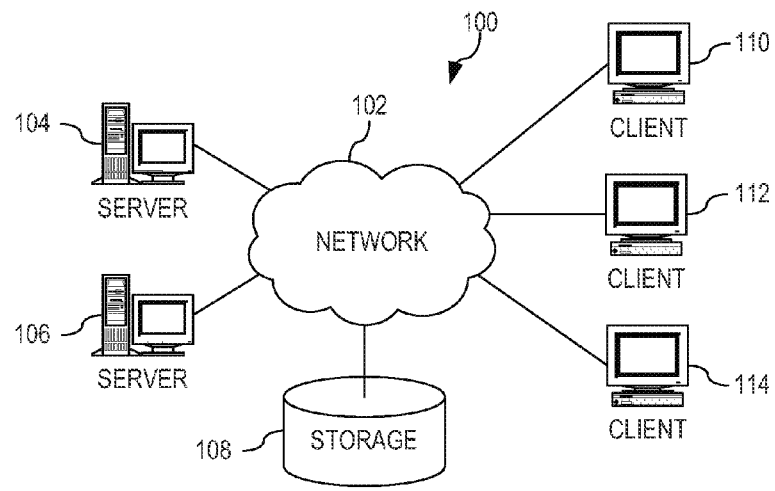
FIG. 1 is an example diagram of a distributed data processing system in which aspects of the illustrative embodiments may be implemented.

The illustrative embodiments provide mechanisms for addressing coupled noise-based violations with buffering in a batch environment. Currently, IC design systems address noise related timing violations by inserting buffers, which is inelegant but nonetheless effective. However, these solutions induce over optimizations such that buffers are inserted on paths that have already been solved. Furthermore, these solutions utilize a one size fits all implementation for all length constraints. If a wire length constraint is too aggressive, many of the solutions are backed out due to too much gate delay being introduced and/or due to wasted power and area on paths that already have positive slack. If a wire constraint is too conservative, then many central processing unit (CPU) intensive repetitions of the algorithm is needed.

The illustrative embodiments provide mechanisms that addresses coupled noise-based violations with buffering in a batch environment by providing a complete full-coupled noise timing analysis. Once complete, the mechanisms create a static list with identified timing violations and delta wire delays from the full-coupled noise timing analysis. The mechanisms perform a simple length-based buffering on all nets in the list with large delta wire delays. That is, the mechanisms tighten a maximum length constraint to force buffer insertions that would not ordinarily be justified on a noise-free timing run. With the buffers inserted, the mechanisms perform a full retiming to verify impact and back out change on nets with degraded slack. The mechanisms may repeat the process with even tighter length constraint if the coupled noise-based violations are not corrected.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
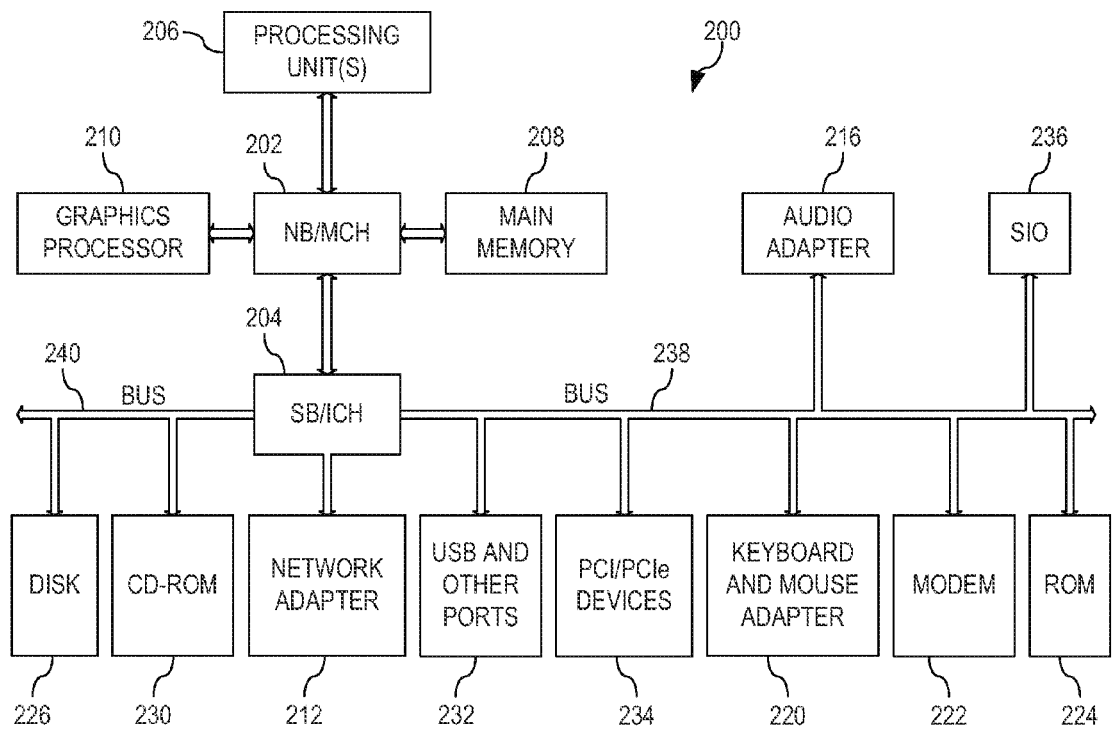
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above. FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for addressing coupled noise-based violations with buffering in a batch environment. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates addressing coupled noise-based violations with buffering in a batch environment.

As noted above, the mechanisms of the illustrative embodiments utilize specifically configured computing devices, or data processing systems, to perform the operations for addressing coupled noise-based violations with buffering in a batch environment. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the addressing coupled noise-based violations with buffering in a batch environment.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As stated previously, the software tools used for designing integrated circuits (ICs) produce, manipulate, or otherwise work with the circuit layout at very small scales. The software tools manipulate these components at the component level or blocks of components level. A block of components is also known as a cell. A cell in an IC design is a portion of the IC design. One way of identifying cells in an IC design is to overlay a grid of imaginary vertical and horizontal lines on the design, and deeming each portion of the IC design bound by horizontal and vertical lines as a cell. The term cell is not limited only to two-dimensional cells. That is, there may be different layers of cells in a z-direction, such as different metal layers. Cells formed in this manner are commonly known as global routing cells or g-cells. Imposing such a three-dimensional grid on an IC design abstracts the global routing problem away from the actual wire implementation and gives a more mathematical representation of the task.

The IC design tool identifies gates or logic cells in the design. The IC design tool manipulates a set of the gates to legalize the design. A set of gates is one or more gate. Legalizing the design is manipulating the gates so no gates overlap each other in the rendering or when formed in the semiconducting material. A legal design results from the legalizing operation. Gates are generally allowed to touch other gates but not overlap in a legal design. A type of gate in an IC design is known as a standard gate. A standard gate is a combination of solid-state devices, such as transistors, which take a specified number of input signals and produce a specified number of output signals, and which implement one or more circuit functions, such as logical AND, or logical OR functions.

An IC design software tool can, among other functions, manipulate cells, or interconnect components of one cell with components of other cells. The interconnects between components are called wires. A wire is a connection between parts of electronic components, and is formed using a metallic material that conducts electricity. That is, a given cell includes a set of components and their interconnections and a set of components is one or more components. A cell may also include pins. A pin of a cell is a point of interconnection in the cell where a wire may be connected to couple a component of the cell with a component of another cell. In other words, pins of a cell are the locations of input/output (I/O) to and from the cell. A set of pins and a wire forming an electrical connection between cells is called a net. A netlist is a list of nets of a set of cells.

Minimizing the length of each wire in a given design is a design consideration in the design of the IC. As the wire length increases between two points, so does the delay in the signal being transmitted over the wire between the two points. To meet the timing requirement of signal, to wit, to keep the delay within a specified threshold, buffers are introduced along the wire length. A buffer may be an inverter, a pair of inverters, or another set of component(s) that reduce the delay between two points in a circuit.

Another design consideration in the design of the IC is the coupling capacitance, which is a function of individual wire properties and the relationship among different wires. That is, changes in signal on one first wire may cause the electrical field around the first wire to change. This change in electrical filed may be experienced by other wires in the vicinity of the first wire which may then cause a delay or timing issue in the other wires. The basic coupling capacitance may be extracted by a parasitic extraction tool that considers the electrical field and geometry of all metal shapes of all wires. When two wires are on a same layer, running parallel to each other, and are in close proximity, then more coupling capacitance may be present in the wires. The length of the parallel part is referred to as overlapping wirelength. The more overlapping wirelength, the more coupling capacitance may be present in the wires.

Coupling capacitance may also depend on the timing window of two neighboring wires. When the two neighboring wires switch at the same time and in different directions (one is from rising to falling, and another falling to rising), then there may be more coupling capacitance in the wires, i.e., real coupling capacitance=2*basic coupling capacitance (basic coupling capacitance is extracted by the extraction tool). When one wire switches and another wire keeps its signal, then real coupling capacitance=1*basic coupling capacitance. The coefficient of determining real coupling capacitance is generally called "k-factor", and this value generally depends on the timing properties of two neighboring wires which are derived from timing analysis of the whole chip. One way to decide such coefficients is to use a static timing analysis tool to find out if the timing window of two wires overlap each other or not. As one can see, coupling capacitance depends on geometry of wires, as well as timing properties of the wires.

One method to resolve coupling issues is to shorten the wires to keep the signal strong and reduce the overlapping wirelength. However, by shortening the wires more buffers are introduced along the wire length, which requires more space in the layer. Another method is to reassign one wire in a different layer. Coupling capacitance becomes smaller for wires in different layers (i.e., if one wire is in horizontal layer k, and another wire is in vertical layer k+1, the distance and the physical overlapping area is much smaller compared to the case where both wires are in the same layer).

Placement problem is the problem of placing the cells of a chip such that the design meets all the design parameters of the chip. Routing is the process of connecting the pins after placement. In other words, placement results in a rendering of the components of various cells as being located in certain positions in the design, whereas routing results in a rendering of how the metal layers would be populated with that placement. A wire can be designed to take any one of the several available paths in a design. Placement of a wire on a certain path, or track, is a part of routing.

A router is a component of IC design tools that performs the routing function. Once the placement component—known as a placer—has performed the placement function, the router attempts to connect the wires without causing congestion and without causing timing delays. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas—cell areas where wires may not be routed.

A global router divides the routing region into small tiles and attempts to route nets through the tiles such that no tile overflows its capacity. After global routing, wires must be assigned to actual tracks within each tile, followed by detail routing which must connect each global route to the actual pin shape on the g-cell. Another type of router—known as the detailed router—performs the detailed routing. The global and detailed routing produced during the design process is usually further modified during optimization of the design.

In a portion of the IC design process, IC design tools generally employ various steps in producing an IC design that works as intended. A circuit designer generally creates the design in a computer programming language in the form of code. The IC design tool accepts the design in the code form and generates a rendering of the design in multiple layers that have be formed in a semiconducting material to create an integrated circuit according to that design. Once the integrated circuit design is generated, modeling is performed to identify timing and noise impacts of the cells and the wires on the outputs. While current IC design systems address noise related timing violations by inserting buffers, which is inelegant but nonetheless effective, these solutions induce over optimizations such that buffers are inserted on paths that have already been solved.

Thus, the illustrative embodiments provide improved mechanisms that addresses coupled noise-based violations with buffering in a batch environment by providing a complete full-coupled noise timing analysis. Once complete, the mechanisms create a static list with identified timing violations and delta wire delays from the full-coupled noise timing analysis. The mechanisms perform a simple length-based buffering on all nets in list with large delta wire delays. That is, the mechanisms tighten a maximum length constraint to force buffer insertions that would not ordinarily be justified on a noise-free timing run. With the buffers inserted, the mechanisms perform a full retiming to verify impact and back out change on nets with degraded slack. The mechanisms may repeat the process with even tighter length constraint if the coupled noise-based violations are not corrected.

Figure 3:
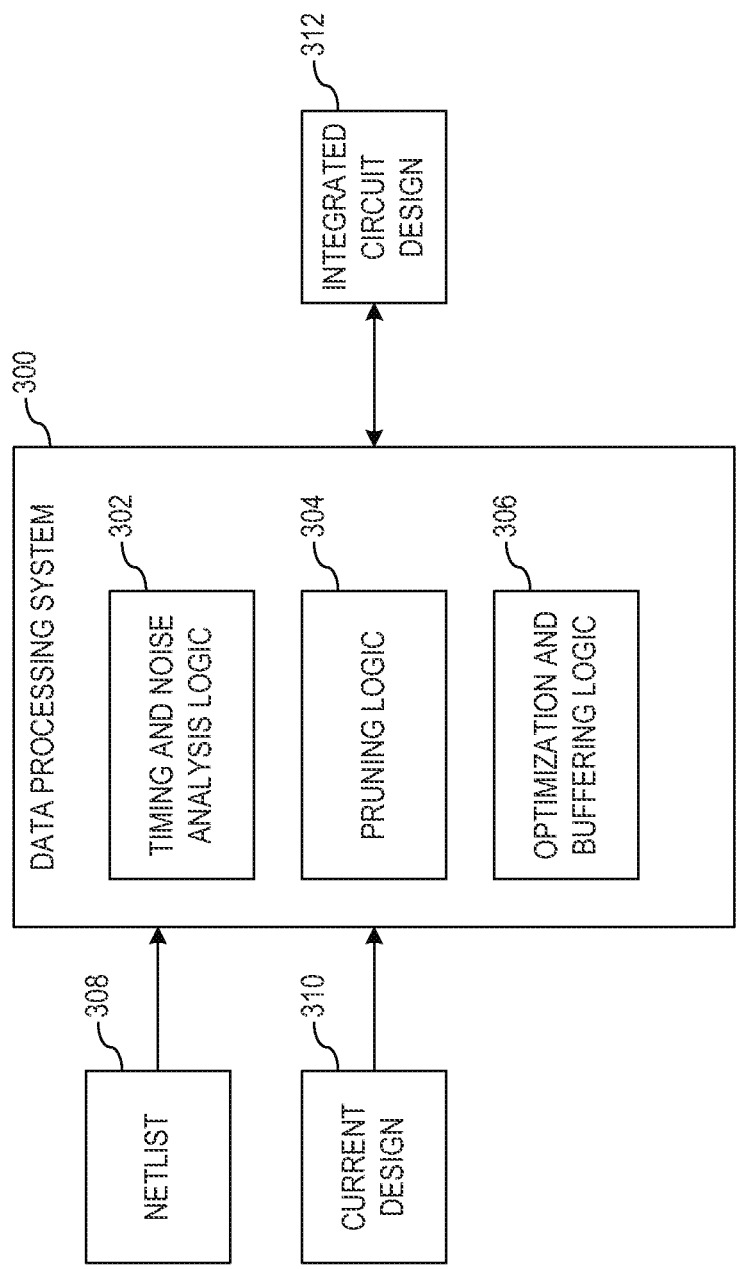
FIG. 3 depicts a block diagram of a mechanism for addressing coupled noise-based violations for an integrated circuit design in accordance with an illustrative embodiment.

FIG. 3 depicts a block diagram of a mechanism for addressing coupled noise-based violations for an integrated circuit design in accordance with an illustrative embodiment. Data processing system 300 comprises timing and noise analysis logic 302, pruning logic 304, and optimization and buffering logic 306. Timing and noise analysis logic 302 is configured to receive either netlist 308, which may include a set of components and a set of nets for a new integrated circuit (IC) design, or current design 310, which may be an existing IC design that has identified coupling issues between nets.

For each net in either netlist 308 or current design 310, timing and noise analysis logic 302 performs a full-coupled timing and noise analysis in order to identify timing violations and/or delta wire delays for each net, which may be performed in several different ways. Older methods perform a wire-to-wire coupling analysis to generate an estimate (K factor) approach that models the capacitive uplift on each net. These older methods feed this additional capacitance into a circuit delay model for the source of the net in order to return the increase in delay, the "delta delay" for the net. Newer methods employ a true noise analysis function to calculate a waveform representing a noise impulse on the net. The waveform's area is then used to compute the delay adjust (delta delay) on the victim net.

Letting StageDelay D be the total time it takes to propagate the signal from the input pin of a gate, though the gate, and down the wire to the input pin of the next gate in the design. Side models used to approximate timing analysis inside numerous optimization algorithms, such as those models used by timing and noise analysis logic 302, use one or more of source current (Li), slew, wire capacitance (Cw) wire resistance (Rw), gate capacitance (Cg), or the like, of the net as identified by netlist 308 or current design 310, to identify a StageDelay D that is a function of one or more of source current (Li), slew at the input pin, wire capacitance (Cw), wire resistance (Rw), gate capacitance (Cg), or the like, as follows:

$$D=\text{StageDelay}(Li,Slew,Cw,Rw,Cg,\text{etc}\ldots)$$

Letting NIOTStageDelay be the total time required to propagate the signal along the same path when a noise analysis function is called and coupled noise is taken into account, then timing and noise analysis logic 302 determines NIOTDeltaDelay as:

$$\text{NIOTDeltaDelay}=\text{NOITStageDelay}-\text{StageDelay}$$

Optimization and buffering logic 306 then determines the k factor, a scaling of the wire capacitance, such that:

$$\text{StageDelay}(Li,Slew,Cw*k,Rw,Cg,\text{etc}\ldots)=\text{StageDelay}(Li,Slew,Cw,Rw,Cg,\text{etc}\ldots)+\text{NIOTDeltaDelay}$$

Optimization and buffering logic 306 may utilize different methods for determining this k factor including a binary search. With the k factor determined, optimization and buffering logic 306 adjusts the wire capacitance applied to the traditional stage delay models by the k factor to take coupled noise into account when determining a new optimization solution for the net.

In performing this analysis, timing and noise analysis logic 302 creates a static list of nets with identified timing violations and delta wire delays from the full-coupled noise timing analysis. For each of the nets in the static list of nets, pruning logic 304 determines whether an associated delta wire delay is below a predetermined threshold thereby forming a subset of nets. For those nets whose associated delta wire delay fails to be below the predetermined threshold, pruning logic 304 forms a subset of nets. Then for each net in the subset of nets, optimization and buffering logic 306 adjusts a stage delay side model of the net to emulate a noise impact on timing of the net.

Utilizing the determined k-factor "k," optimization and buffering logic 306 applies one or more optimizations, such as buffer optimization, gate sizing, or the like, to the net using the stage delay side model of the net. Once the optimization is applied, timing and noise analysis logic 302 performs a full retiming of the nets in the subset of nets. For each net in the subset of nets, timing and noise analysis logic 302 determines whether the net has degraded slack. Responsive to the net having degraded slack, optimization and buffering logic 306 backs out the applied optimization. Once all of the nets have been analyzed, optimization and buffering logic 306 creates an integrated circuit design 312.

While in the above embodiment optimization and buffering logic 306 may apply one or more optimizations to each net in the subset of nets, in another embodiment optimization and buffering logic 306 may selectively apply one or more optimizations by sorting the subset of nets by endpoints affected by each net. Optimization and buffering logic 306 may then apply the one or more optimizations to each net one-by-one using the stage delay side model of the net by affected endpoint, wherein the one or more optimizations are applied to nets associated with the affected endpoint starting with a largest noise impact on timing value before applying the one or more optimizations to the other nets associated with the affected endpoint. Responsive to application of the one or more optimizations to the net associated with the affected endpoint with the largest noise impact on timing value improving the slack improvement of the affected endpoint, timing and noise analysis logic 302 performs a full retiming of the subset of nets. Pruning logic 304 then determines whether an new associated delta wire delay is below a predetermined threshold. For those nets whose new associated delta wire delay fails to be below the predetermined threshold, pruning logic 304 forms a new subset of nets. Optimization and buffering logic 306 may sort the new subset of nets by endpoints affected by each net and apply the one or more optimizations using the stage delay side model of the net by affected endpoint, wherein the buffer optimization is applied to the nets associated with the affected endpoint starting with a largest noise impact on timing value before applying optimizations to the other nets associated with the affected endpoint. Once all of the endpoints have been analyzed, optimization and buffering logic 306 creates an integrated circuit design 312.

Figure 4A:
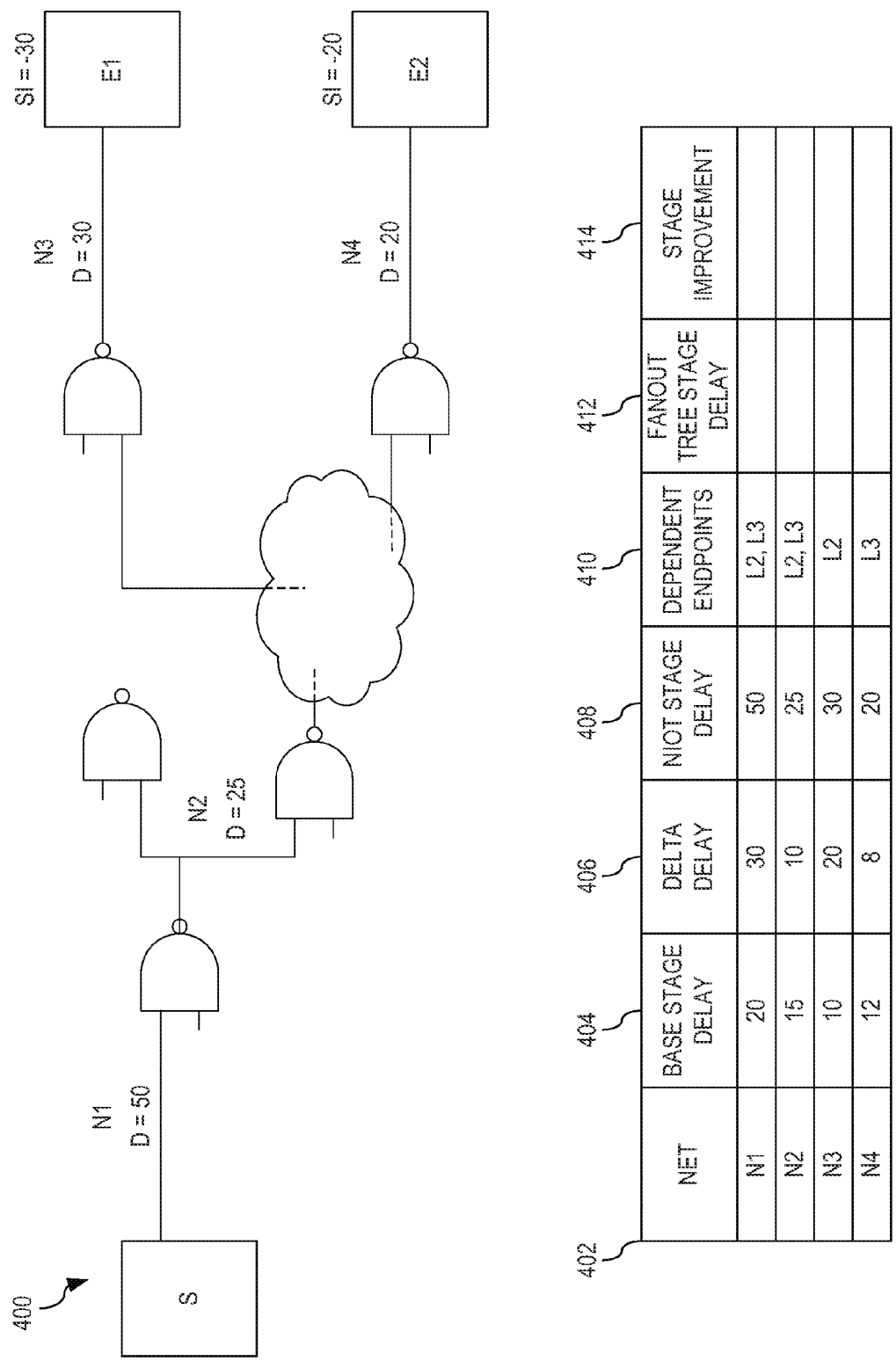
FIGS. 4A-4C illustrate the selective buffer optimization to reduce Noise Impact on Timing (NIOT) in accordance with an illustrative embodiment.
Figure 4B:
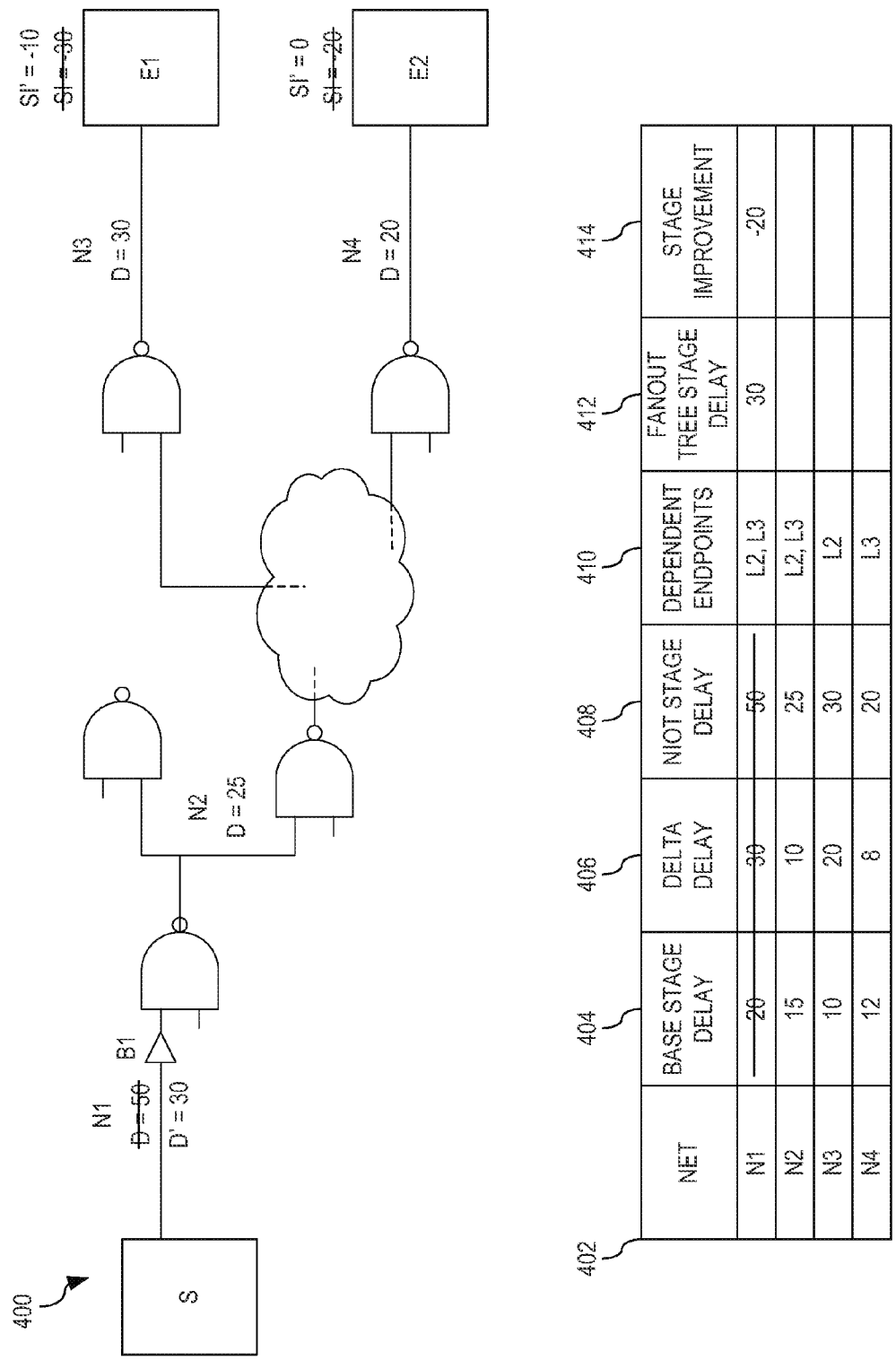
Figure 4C:
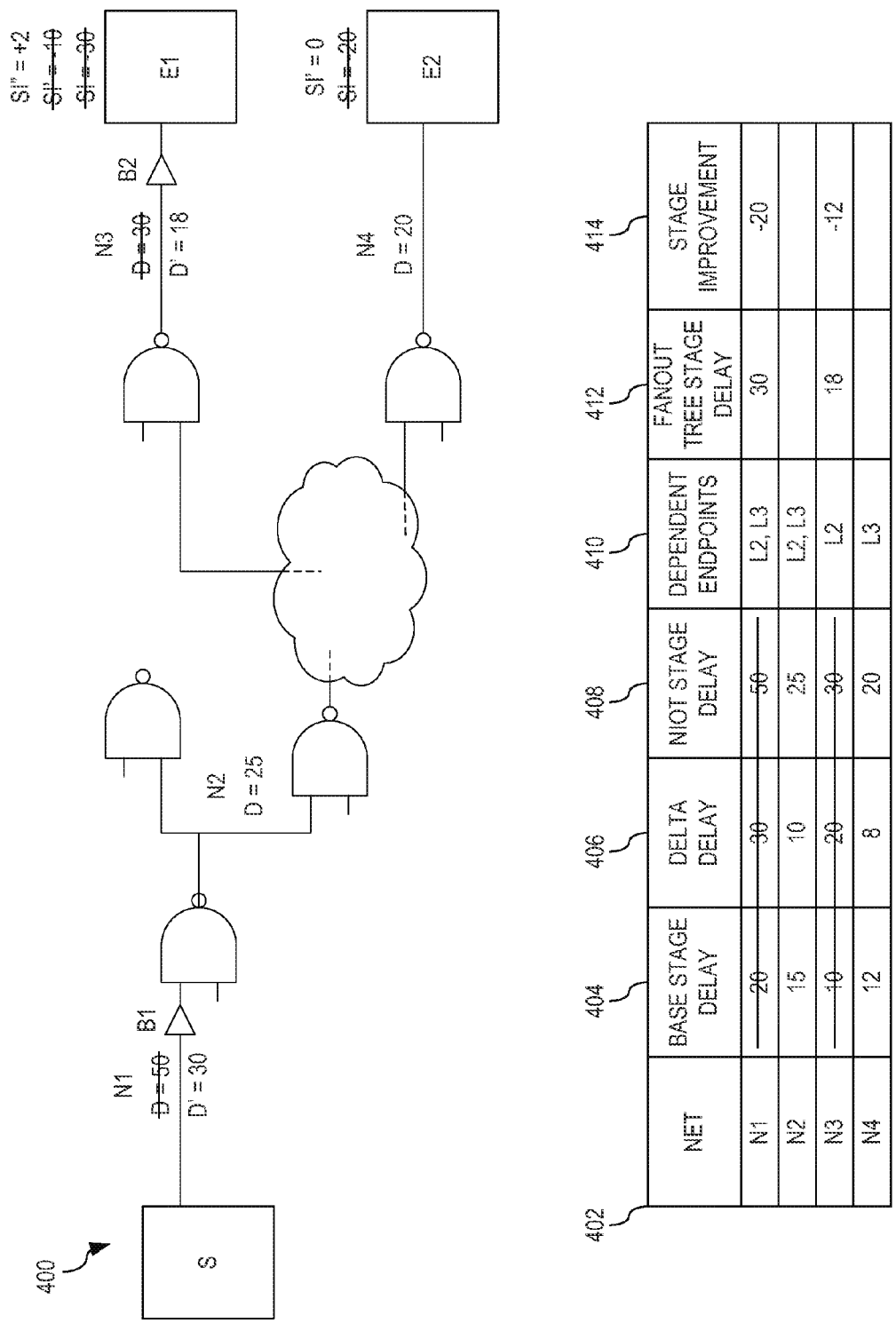

FIGS. 4A-4C illustrate the selective buffer optimization to reduce Noise Impact on Timing (NIOT) in accordance with an illustrative embodiment. In FIG. 4A, for integrated circuit 400, timing and noise analysis logic, such as timing and noise analysis logic 302 of FIG. 3, identifies four nets N1, N2, N3, and N4 have been determined between starting point S and endpoints E1 and E2. As is illustrated in table 402, for each of the nets N1, N2, N3, and N4, optimization and buffering logic, such as optimization and buffering logic 306 of FIG. 3, identifies a base stage delay 404 and a delta delay 406, both in picoseconds. Utilizing the base stage delay 404 and the delta delay 406, the optimization and buffering logic determined the NIOT stage delay 408, which is a sum of the base stage delay 404 and the delta delay 406. Additionally, the optimization and buffering logic identifies dependent endpoints 410 affected by each of the nets N1, N2, N3, and N4 as well as the overall delay SI of endpoints E1 and E2, which is −30 picoseconds and −20 picoseconds, respectively.

As described above in FIG. 3, the optimization and buffering logic applies the one or more optimizations to each net one-by-one starting with a largest noise impact on timing value, which in this example is net N1. As is illustrated in FIG. 4B, the optimization and buffering logic adds buffering B1 to net N1 that results in a new stage delay D' of 30 picoseconds to net N1, which is identified in new stage delay 412, which provides a −20 picoseconds improvement to net N1, which is identified in stage improvement 414. As is also illustrated in FIG. 4B, the optimization and buffering logic identifies an improvement in new overall delay SI' of endpoints E1 and E2, which is now −10 picoseconds and 0 picoseconds, respectively. Thus, with the single buffering to net N1, the overall delay of endpoint E2 has been improved such that no more buffering to any net that affects endpoint E2 is needed. However, there is still a delay at endpoint E1.

In order to address the delay at endpoint E1, as is illustrated in FIG. 4C, the optimization and buffering logic adds buffering B2 to net N3 that results in a new stage delay D' of 18 picoseconds to net N3, which is identified in new stage delay 412, which provides a −12 picoseconds improvement to net N3, which is identified in stage improvement 414. As is also illustrated in FIG. 4C, the optimization and buffering logic identifies an improvement in overall delay SI" of endpoint E1, which is now +2 picoseconds. Thus, the optimization and buffering logic applies buffer optimization to each net one-by-one using the stage delay side model of the net by affected endpoint, wherein the buffer optimization is applied to nets associated with the affected endpoint starting with a largest noise impact on timing value before applying buffer optimization to the other nets associated with the affected endpoint.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
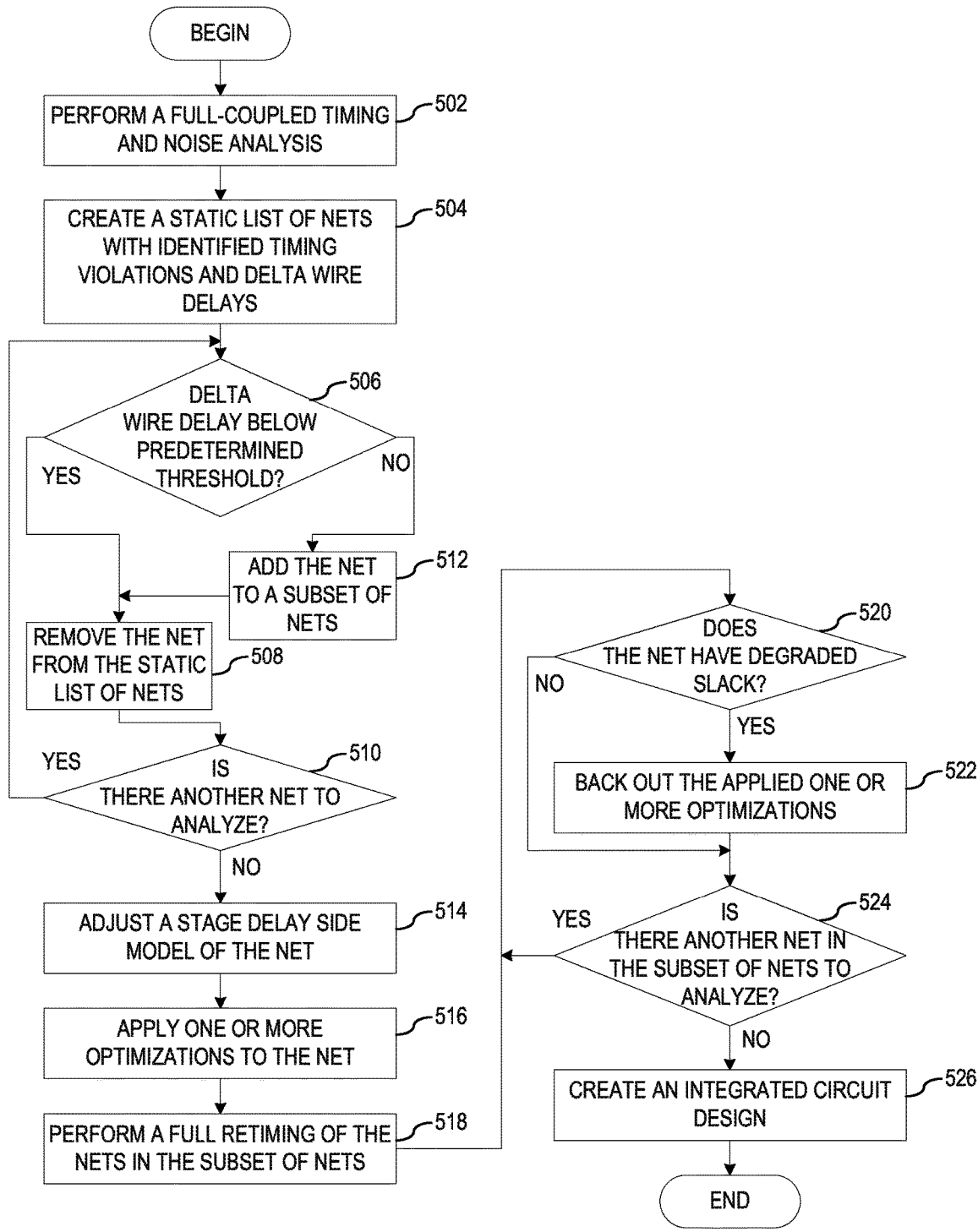
FIG. 5 depicts a flowchart of the operation performed by a mechanism for addressing coupled noise-based violations for an integrated circuit design in accordance with an illustrative embodiment.

FIG. 5 depicts a flowchart of the operation performed by a mechanism for addressing coupled noise-based violations for an integrated circuit design in accordance with an illustrative embodiment. As the operation begins, the mechanism, executed by a processor, performs a full-coupled timing and noise analysis in order to identify timing violations and/or delta wire delays for each net in either a netlist or a current design (step 502). In performing this analysis, the mechanism creates a static list of nets with identified timing violations and delta wire delays from the full-coupled noise timing analysis (step 504). For each of the nets in the static list of nets, the mechanism determines whether an associated delta wire delay is below a predetermined threshold thereby forming a subset of nets (step 506). If at step 506 the mechanism determines that the delta wire delay is below the predetermined threshold, the mechanism removes the net from the static list of nets (step 508) and determines whether there is another net to analyze (step 510). If at step 506 the mechanism determines that the delta wire delay fails to be below the predetermined threshold, the mechanism adds the net to a subset of nets (step 512), with the operation proceeding to step 508 thereafter.

If at step 510 the mechanism determines that there is another net in the static list of nets to analyze, the operation returns to step 506. If at step 510 the mechanism determines that there is no other net in the static list of nets to analyze, the mechanism adjusts a stage delay side model of the net to emulate a noise impact on timing of the net (step 514). That is, the mechanism utilizes one or more of source current (Li), slew, wire capacitance (Cw) wire resistance (Rw), gate capacitance (Cg), or the like, of the net as identified by the netlist or the current design, to identify a delta wire delay D that is equal to a function of stage delay, i.e. one or more of source current (Li), slew, wire capacitance (Cw), wire resistance (Rw), gate capacitance (Cg), or the like, as follows:

$$D=\text{StageDelay}(Li,\text{Slew},Cw,Rw,Cg,\text{etc}\ldots).$$

By injecting the impact of the noise into the buffer optimization model, the mechanism identifies the coefficient of determining real coupling capacitance, i.e. "k-factor," which generally depends on the timing properties of two neighboring wires which are derived from timing analysis of the whole chip, and this forms the Noise Impact on Timing (NIOT) stage delay. Thus, the delta wire delay increases in stage delay when the noise impact on timing (NIOT) of the net is taken into account. In accordance with the illustrative embodiments, optimization and buffering logic 306 identifies the k-factor "k" such that:

$$\text{NIOTStageDelay}(Li,\text{Slew},Ci*k,Rw,Cg,\text{etc}\ldots)=\text{StageDelay}(Li,\text{Slew},Cw,Rw,Cg,\text{etc}\ldots)+D$$

That is, the mechanism varies the wire capacitance (Cw) by the k-factor "k" so that the NIOT stage delay is determined that equals the original stage delay plus the determined delta wire delay D. Utilizing the determined k-factor "k," the mechanism applies one or more optimizations, such as buffering, gate sizing, or the like, to the net using the stage delay side model of the net (step 516). Once the one or more optimizations are applied, the mechanism performs a full retiming of the nets in the subset of nets (step 518).

For each net in the subset of nets, the mechanism determines whether the net has degraded slack (step 520). If at step 520 the mechanism determines that the net has degraded slack, the mechanism backs out the applied one or more optimizations (step 522). From step 522 or if at step 520 the mechanism determines that the net fails to have degraded slack, the mechanism determines whether there is another net in the subset of nets to analyze (step 524). If at step 524 the mechanism determines that there is another net in the subset of nets to analyze, the operation returns to step 520. If at step 524 the mechanism determines that there is no other net in the subset of nets to analyze, the mechanism creates an integrated circuit design (step 526), with the operation terminating thereafter.

Figure 6:
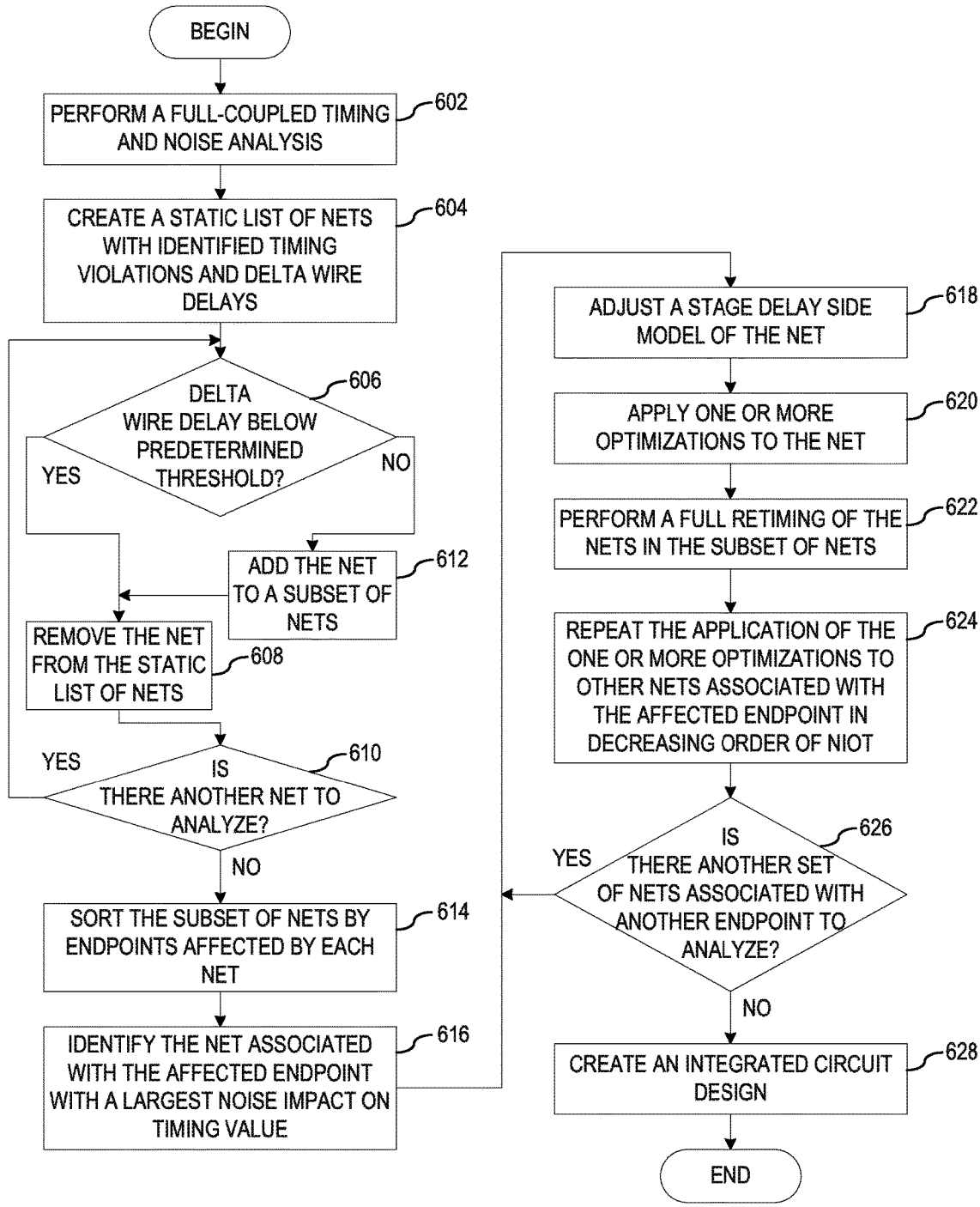
FIG. 6 depicts a flowchart of the operation performed by a mechanism for addressing coupled noise-based violations for an integrated circuit design in accordance with an illustrative embodiment.

FIG. 6 depicts a flowchart of the operation performed by a mechanism for addressing coupled noise-based violations for an integrated circuit design in accordance with an illustrative embodiment. As the operation begins, the mechanism, executed by a processor, performs a full-coupled timing and noise analysis in order to identify timing violations and/or delta wire delays for each net in either a netlist or a current design (step 602). In performing this analysis, the mechanism creates a static list of nets with identified timing violations and delta wire delays from the full-coupled noise timing analysis (step 604). For each of the nets in the static list of nets, the mechanism determines whether an associated delta wire delay is below a predetermined threshold thereby forming a subset of nets (step 606). If at step 606 the mechanism determines that the delta wire delay is below the predetermined threshold, the mechanism removes the net from the static list of nets (step 608) and determines whether there is another net to analyze (step 610). If at step 606 the mechanism determines that the delta wire delay fails to be below the predetermined threshold, the mechanism adds the net to a subset of nets (step 612), with the operation proceeding to step 608 thereafter.

If at step 610 the mechanism determines that there is another net in the static list of nets to analyze, the operation returns to step 606. If at step 610 the mechanism determines that there is no other net in the static list of nets to analyze, the mechanism sorts the subset of nets by endpoints affected by each net (step 614). For each affected net, the mechanism identifies the net associated with the affected endpoint with a largest noise impact on timing value (step 616). For that net, the mechanism adjusts a stage delay side model of the net to emulate a noise impact on timing of the net (step 618). That is, the mechanism utilizes one or more of source current (Li), slew, wire capacitance (Cw) wire resistance (Rw), gate capacitance (Cg), or the like, of the net as identified by the netlist or the current design, to identify a delta wire delay D that is equal to a function of stage delay, i.e. one or more of source current (Li), slew, wire capacitance (Cw), wire resistance (Rw), gate capacitance (Cg), or the like, as follows:

$$D = StageDelay(Li, Slew, Cw, Rw, Cg, etc \ldots).$$

Letting NIOTStageDelay be the total time required to propagate the signal along the same path when a noise analysis function is called and coupled noise is taken into account, then mechanism determines NIOTDeltaDelay as:

$$NIOTDeltaDelay = NOITStageDelay - StageDelay$$

The mechanism then determines the k factor, a scaling of the wire capacitance, such that:

$$StageDelay(Li, Slew, Cw*k, Rw, Cg, etc \ldots) = StageDelay(Li, Slew, Cw, Rw, Cg, etc \ldots) + NIOTDeltaDelay$$

That is, the mechanism varies the wire capacitance (Cw) by the k-factor "k" so that the NIOT stage delay is determined that equals the original stage delay plus the determined delta wire delay D. Utilizing the determined k-factor "k," the mechanism applies one or more optimizations, such as buffering, gate sizing, or the like, to the net using the stage delay side model of the net (step 620). Once the one or more optimizations are applied, the mechanism performs a full retiming of the nets in the subset of nets (step 622). The mechanism then repeats the application of the one or more optimizations to other nets associated with the affected endpoint in decreasing order of noise impact on timing value until the overall delay associated with each endpoint is zero or better (step 624). The mechanism determines whether there is another set of nets associated with another endpoint to analyze (step 626). If at step 626 the mechanism determines that there is another set of nets associated with another endpoint to analyze, the operation returns to step 618. If at step 626 the mechanism determines that there is no other net in the subset of nets to analyze, the mechanism creates an integrated circuit design (step 628), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for addressing coupled noise-based violations with buffering in a batch environment by providing a complete full-coupled noise timing analysis. Once complete, the mechanisms create a static list with identified timing violations and delta wire delays from the full-coupled noise timing analysis. The mechanisms perform a simple length-based buffering on all nets in list with large delta wire delays. That is, the mechanisms tighten a maximum length constraint to force buffer insertions that would not ordinarily be justified on a noise-free timing run. With the buffers inserted, the mechanisms perform a full retiming to verify impact and back out change on nets with degraded slack. The mechanisms may repeat the process with even tighter length constraint of the coupled noise-based violations are not corrected.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, for addressing coupled noise-based violations, the method comprising:

for each net in an integrated circuit (IC) design with coupled noise-based violations, determining, by the data processing system, whether an associated delta wire delay is below a predetermined threshold;

responsive to the associated delta wire delay failing to be below the predetermined threshold, forming, by the data processing system, a subset of nets;

sorting, by the data processing system, the subset of nets by endpoints affected by each net thereby forming sets of nets with common affected endpoints; and for each set of nets with a common affected endpoint in the sets of nets with common affected endpoints:

identifying, by the data processing system, a net in the set of nets with a common affected endpoint having a largest noise impact;

adjusting, by the data processing system, a stage delay side model of the net to emulate a noise impact on timing of the net;

applying, by the data processing system, an optimization using the stage delay side model of the net before applying optimization to the other nets associated with the common endpoint;

determining, by the data processing system, whether the optimization has improved an overall delta wire delay of the common affected endpoint;

responsive to the optimization degrading the overall delta wire delay of the common affected endpoint, backing out, by the data processing system, the applied optimization;

responsive to the optimization improving the overall delta wire delay of the common affected endpoint, determining, by the data processing system, whether the optimization has improved an overall delta wire delay of the common affected endpoint to be greater than or equal to zero;

responsive the optimization failing to improve the overall delta wire delay of the common affected endpoint to be greater than or equal to zero:

performing, by the data processing system, a full retiming of the set of nets with a common affected endpoint; and repeating, by the data processing system, the identifying, adjusting, applying, and determining for the set of nets with a common affected endpoint; and responsive to the optimization improving the overall delay of each of the sets of nets with common affected endpoints to be greater than or equal to zero, outputting, by the data processing system, an integrated circuit design without coupled noise-based violations for fabricating an integrated circuit according to the integrated circuit design without coupled noise-based violations.

2. The method of claim 1, wherein the optimization is at least one of buffering or gate sizing.

3. The method of claim 1, wherein the subset of nets is a portion of a set of nets of the IC design and wherein the subset of nets are identified by having timing violations and delta wire delays.

4. The method of claim 3, wherein the timing violations and delta wire delays are identified by performing a full-coupled timing and noise analysis to the IC design.

5. The method of claim 1, wherein the delta wire delay is increased in stage delay when the noise impact on timing of the net is taken into account.

6. The method of claim 1, wherein the delta wire delay is stage delay that is determined using one or more of source current (Li), slew, wire capacitance (Cw) wire resistance (Rw), and gate capacitance (Cg) of the net.

7. A computer program product comprising a computer readable storage medium having a computer readable program stored therein, wherein the computer readable program, when executed on a computing device, causes the computing device to:

for each net in an integrated circuit (IC) design with coupled noise-based violations, determine whether an associated delta wire delay is below a predetermined threshold;

responsive to the associated delta wire delay failing to be below the predetermined threshold, form a subset of nets;

sort the subset of nets by endpoints affected by each net thereby forming sets of nets with common affected endpoints; and for each set of nets with a common affected endpoint in the sets of nets with common affected endpoints:
  identify a net in the set of nets with a common affected endpoint having a largest noise impact;
  adjust a stage delay side model of the net to emulate a noise impact on timing of the net;
  apply an optimization using the stage delay side model of the net before applying optimization to the other nets associated with the common endpoint;
  determining, by the data processing system, whether the optimization has improved an overall delta wire delay of the common affected endpoint;
  responsive to the optimization degrading the overall delta wire delay of the common affected endpoint, backing out, by the data processing system, the applied optimization;
  responsive to the optimization improving the overall delta wire delay of the common affected endpoint, determining, by the data processing system, whether the optimization has improved an overall delta wire delay of the common affected endpoint to be greater than or equal to zero;
  responsive the optimization failing to improve the overall delta wire delay of the common affected endpoint to be greater than or equal to zero:
    perform a full retiming of the set of nets with a common affected endpoint; and
    repeat the identifying, adjusting, applying, and determining for the set of nets with a common affected endpoint; and
  responsive to the optimization improving the overall delay of each of the sets of nets with common affected endpoints to be greater than or equal to zero, output an integrated circuit design without coupled noise-based violations for fabricating an integrated circuit according to the integrated circuit design without coupled noise-based violations.

8. The computer program product of claim 7, wherein the optimization is at least one of buffering or gate sizing.

9. The computer program product of claim 7, wherein the subset of nets is a portion of a set of nets of the IC design and wherein the subset of nets are identified by having timing violations and delta wire delays.

10. The computer program product of claim 7, wherein the delta wire delay is increase in stage delay when the noise impact on timing of the net is taken into account.

11. An apparatus comprising:
a processor; and
a memory coupled to the processor, wherein the memory comprises instructions which, when executed by the processor, cause the processor to:
for each net in an integrated circuit (IC) design with coupled noise-based violations, determine whether an associated delta wire delay is below a predetermined threshold;
responsive to the associated delta wire delay failing to be below the predetermined threshold, form a subset of nets;
sort the subset of nets by endpoints affected by each net thereby forming sets of nets with common affected endpoints; and
for each set of nets with a common affected endpoint in the sets of nets with common affected endpoints:
  identify a net in the set of nets with a common affected endpoint having a largest noise impact;
  adjust a stage delay side model of the net to emulate a noise impact on timing of the net;
  apply an optimization using the stage delay side model of the net before applying optimization to the other nets associated with the common endpoint;
  determining, by the data processing system, whether the optimization has improved an overall delta wire delay of the common affected endpoint;
  responsive to the optimization degrading the overall delta wire delay of the common affected endpoint, backing out, by the data processing system, the applied optimization;
  responsive to the optimization improving the overall delta wire delay of the common affected endpoint, determining, by the data processing system, whether the optimization has improved an overall delta wire delay of the common affected endpoint to be greater than or equal to zero;
  responsive the optimization failing to improve the overall delta wire delay of the common affected endpoint to be greater than or equal to zero:
    perform a full retiming of the set of nets with a common affected endpoint; and
    repeat the identifying, adjusting, applying, and determining for the set of nets with a common affected endpoint; and
  responsive to the optimization improving the overall delay of each of the sets of nets with common affected endpoints to be greater than or equal to zero, output an integrated circuit design without coupled noise-based violations for fabricating an integrated circuit according to the integrated circuit design without coupled noise-based violations.

12. The apparatus of claim 11, wherein the optimization is at least one of buffering or gate sizing.

13. The apparatus of claim 11, wherein the subset of nets is a portion of a set of nets of the IC design and wherein the subset of nets are identified by having timing violations and delta wire delays.

14. The apparatus of claim 11, wherein the delta wire delay is increase in stage delay when the noise impact on timing of the net is taken into account.

* * * * *